United States Patent [19]

Inomata et al.

[11] 3,950,304

[45] Apr. 13, 1976

[54] CURABLE COMPOSITION USED FOR AN ELECTRICAL INSULATING MATERIAL

[75] Inventors: Jihei Inomata, Komae; Susumu Michishima; Kanji Kasahara, both of Yokohama; Seiichi Hino, Yokohama; Satoru Igarashi, Kawasaki; Tatsuo Tani, Yokohama, all of Japan

[73] Assignee: Mitsubishi Chemical Industries Ltd., Tokyo, Japan

[22] Filed: Feb. 1, 1974

[21] Appl. No.: 438,859

[30] Foreign Application Priority Data
Feb. 9, 1973   Japan.............................. 48-15583

[52] U.S. Cl. ...... 260/42.37; 260/42.47; 260/94.7 A; 260/94.7 H
[51] Int. Cl.².. C08C 19/04; C08K 3/04; C08K 3/34
[58] Field of Search......... 260/94.7 A, 42.37, 42.47, 260/94.7 H

[56] References Cited
UNITED STATES PATENTS

| | | | |
|---|---|---|---|
| 3,157,614 | 11/1964 | Fischer .............................. 260/42.37 |
| 3,269,978 | 8/1966 | Short et al. ..................... 260/94.7 A |
| 3,484,405 | 12/1969 | Seto................................. 260/42.47 |
| 3,510,459 | 5/1970 | Mersereau ..................... 260/94.7 A |
| 3,663,659 | 5/1972 | Kray et al. ..................... 260/94.7 A |

OTHER PUBLICATIONS

Rubber World – Materials & Compounding Ingredients for Rubber (Bill Publications) (N.Y.) (1968), pp. 277, 278, 283.

*Primary Examiner*—Donald E. Czaja
*Assistant Examiner*—H. H. Fletcher
*Attorney, Agent, or Firm*—Oblon, Fisher, Spivak, McClelland & Maier

[57] ABSTRACT

A curable composition used for electric insulating material comprises a polyhydroxy hydrocarbon polymer, carbon black and talc or clay.

8 Claims, No Drawings

CURABLE COMPOSITION USED FOR AN ELECTRICAL INSULATING MATERIAL

BACKGROUND OF THE INVENTION

1. Field of the Invention

This invention relates to a curable composition having excellent molding processability which produces a cured product having excellent mechanical and electrical characteristics.

2. Description of the Prior Art

Heretofore, curable compositions of polyhydroxy hydrocarbon polymers and a curing agent which may also contain a reinforcing material or a filler such as carbon black have been known. However, the cured products prepared by curing the conventional curable compositions do not have satisfactory characteristics. Although the cured products containing carbon black have excellent mechanical characteristics they have a high dielectric constant and dielectric loss tangent and a low volume specific resistance and breakdown voltage so that they are not suitable for use as an electrical insulating material. A need exists therefore, for curable compositions of polyhydroxy hydrocarbon polymer having an improved mold-processability and a cured product which has good mechanical and electrical characteristics.

SUMMARY OF THE INVENTION

Accordingly, one object of this invention is to provide a curable composition having excellent mold processability.

Another object of the invention is to provide a cured product having excellent mechanical and electrical characteristics.

Briefly, this and other objects of the invention as hereinafter will become more readily apparent are achieved by providing a curable composition of a polyhydroxy hydrocarbon polymer, carbon black and talc or clay, and a curing agent.

DETAILED DESCRIPTION OF THE INVENTION

The polyhydroxy hydrocarbon polymer used for the curable composition of this invention has an average number of hydroxyl groups per molecule of more than 1.5, preferably 1.8 – 8.0. In general, the number of hydroxyl groups of the polyhydroxy hydrocarbon polymer depends upon the number of functional groups in the curing agent used. For example, when a bifunctional curing agent, such as tolylenediisocyanate is used the preferable number of hydroxyl groups is in the range of 2.0 – 3.0. When the hydroxyl group number is less than 20 the degree of cross linking of the cured product is insufficient and the cured product has inferior mechanical characteristics.

However, a polyhydroxy hydrocarbon polymer having a relatively small number of hydroxyl groups can be practically used, if a curing agent having many functional groups is used to prepare the cured product. In any case, the lower limit for the number of hydroxyl groups is about 1.5. On the other hand, if the number of hydroxyl groups is too high, the curing reaction is too fast which results in a curing reaction which is not smooth.

The curing velocity (rate) can be controlled to a certain degree by the type of curing agent selected or by decreasing the temperature during the curing reaction. In general, it is preferable to use a polyhydroxy hydrocarbon polymer having a hydroxyl group number of 1.8 – 8.0, although the invention is not limited to this range.

Suitable polyhydroxy hydrocarbon polymers used in this invention include the polyhydroxy diene type polymers, the hydrogenated polyhydroxy diene type polymers, a mixture of the polyhydroxy diene type, unsaturated polymers and polyhydroxy diene type saturated polymers, the oxidized-hydrogenated product of isobutylene-diene copolymers, the oxidized-hydrogenated product of α-olefin-nonconjugated diene copolymers, and the like.

Embodiments of the polyhydroxy hydrocarbon polymers and their methods of manufacture will now be illustrated in detail.

Suitable polyhydroxy diene polymers include conjugated diene homopolymers, copolymers of a conjugated diene and other monomers such as vinyl monomers. The copolymer compositions, preferably contain less than 75 wt.%, preferably less than 50 wt.%, of the other monomer. These polymers can be prepared by various processes, for example, by the conventional polymerization of a conjugated diene or a mixture of a conjugated diene and another monomer by using hydrogenperoxide as an initiator. It is also possible to prepare the polymers by polymerization using other initiators, such as those which contain a functional group e.g. azobi sisonitrile.

The conjugated dienes include 1,3-butadiene, isoprene, 1,3-pentadiene, 2,3-dimethylbutadiene and the like.

The other monomer which is combined with the conjugated diene monomer includes vinyl monomers or vinylidene monomers having the formula:

wherein $R^1$ represents a hydrogen atom or an alkyl group; $R^2$ represents aryl, carboxyl, ester, nitrile or pyridyl groups. Such monomers include styrene, acrylonitrile, acrylic acid, methacrylic acid, acrylate, methacrylate and mixtures thereof.

Another process for preparing the polyhydroxy diene polymers is to react a living diene polymer with a halogenoalkyleneoxide and to treat the resulting product with a protonic acid. It is also possible to prepare the same by reacting the living diene polymer with a halogenoalkyleneoxide or polyepoxide, then reacting a monoepoxide with the reaction product and finally treating the resulting product with a protonic acid.

The living diene polymer used in these processes can be easily obtained by polymerizing a conjugated diene or a mixture of conjugated diene and other monomer in the presence of an alkali metal or an organo-alkali metal compound. The organo-alkali metal compound used in the process includes alkali metal complexes such as lithium complexes of naphthalene, anthracene, biphenyl; and the like; dialkali metal hydrocarbons such as 1, 4-dialkali metal butane, 1, 5-dialkali metal pentane, 1, 10-dialkali metal decane, 1, 4-dialkali metal 1, 1, 4, 4-tetraphenylbutane and the like.

A hydrocarbon medium such as hexane, heptane, benzene, toluene, xylene or cyclohexane can be used to facilitate the polymerization.

Organo-alkali metal compounds are usually not very soluble in hydro-carbon media so that it is preferable to solubilize them first with an ether having a relatively low polarity such as diethyl ether, dipropyl ether, ethyl propyl ether, butyl ether, or the like.

The polyhydroxy diene polymer may also be obtained by the reaction of an epoxy compound such as a halogenoalkyleneoxide, polyepoxide, monoepoxide or the like with the living polymer having an alkali metal at both ends, followed by the treatment of the product with a protonic acid such as hydrochloric acid, sulfuric acid, acetic acid, or the like.

The epoxy compounds used in the process of this invention include monoepoxy compounds such as ethyleneoxide, propyleneoxide, butyleneoxide, cyclohexeneoxide, styreneoxide, phenylglycidyl ether, or the like; polyepoxy compounds such as a diglycidyl ether of bisphenol A, vinylcyclohexenediepoxide, butadiene epoxide, dicyclopentadienediepoxide, limonene diepoxide, ethyleneglycol bisglycidyl ether or the like; halogenoalkyleneoxides, such as epichlorohydrin, epibromohydrin or the like. These epoxy compounds can be individually selected or combined to adjust the number of hydroxyl groups per molecule to within the desired value.

The polyhydroxy diene type polymers preferably have a viscosity of 0.3 – 1000 poises at room temperature and a molecular weight of 500 – 20,000 (measured by Vapor Pressure Osmometry Method).

The polyhydroxy diene polymer thus obtained can be hydrogenated to prepare polyhydroxy hydrocarbon polymers which are completely or partially saturated. When the hydrogenated polymer is used as the polymer, the cured compositions having excellent weather durability, heat resistance and mechanical strength are obtained.

In the hydrogenation reaction, more than 70%, preferably more than 80%, and most preferably about 100% of the double bonds of the diene type unsaturated hydrocarbon polymer are saturated in the presence of a catalyst such as a nickel type catalyst e.g., Raney nickel; or the like, a ruthenium type catalyst, a cobalt type catalyst, a platinum type catalyst, a palladium type catalyst, a rhodium type catalyst or mixtures thereof; alloy type catalyst or the like. These catalysts may be used alone as solids as soluble uniform catalysts, or supported on a carrier of carbon, silica, diatomaceous earth or the like. It is also possible to hydrogenate the polyhydroxy diene polymers by using a metal complex prepared by reducing a nickel, titanium or cobalt compound with an organo metal compound. These catalysts include trialkyl aluminum, alkyllithium, or the like.

During hydrogenation, the hydrogen pressure can be applied by an atmospheric pressure flow or a high pressure flow system, and the reaction temperature is in the range of from room temperature to 200° C, preferably lower than 150° C.

The hydrogenation reaction can be performed by using molecular hydrogen gas or a gas containing the same in the absence of solvent, and also can be performed by dissolving the polymer in a suitable solvent. Suitable solvents used for the reaction include aliphatic hydrocarbons, acyclic hydrocarbons, aromatic hydrocarbons, alcohols, aliphatic carboxylic acids and the solvent can be used alone or in a mixture.

Still another process for preparing the polyhydroxy hydrocarbon polymer is the oxidation of an α-olefin-unsaturated monomer containing copolymer followed by the reduction of the product. For example, a butyl rubber type polymer prepared by the cationic polymerization of isobutylene and butadiene or 1, 3-pentadiene, is oxidized with ozone and then is reduced with lithium aluminum hydride to prepare polyhydroxy polyisobutylene.

Poly-α-olefins having unsaturated bonds may be prepared by copolymerizing a diene with an α-olefin, oxidizing the resulting copolymer with ozone and then reducing the polymer to prepare polyhydroxypolyolefin.

In the invention, it is possible to use a mixture of a polyhydroxy diene type unsaturated hydrocarbon polymer and a polyhydroxy diene type saturated hydrocarbon polymer. The amounts of the two polymer components selected can be varied depending upon the intended use of the cured composition. Thus, the amount of the polyhydroxy diene unsaturated hydrocarbon polymer can range from 2–50% by weight, while the amount of the polyhydroxy diene saturated hydrocarbon polymer can range from 50–98% by weight.

For example, when high thermal deterioration resistance or weather durability is required, the amount of the diene type saturated hydrocarbon in the polymer mixture is increased. On the other hand, when elasticity is required, the amount of the diene type unsaturated hydrocarbon polymer is increased.

Suitable curing agents in the curable composition of the invention include polycarboxylic acids, anhydrides thereof, halides thereof, polyepoxides, polyisocyanate mixtures thereof or the like. The amount of the curing agent used is usually from 1 – 50% by weight based on the weight of polymer. It is preferable to use a curing catalyst. The curing catalysts include Lewis acids, Lewis bases, organo metal compounds, organo metal complexes or the like. Both the curing catalysts and curing agents are conventional to the art.

The curable polymer composition of the invention is characterized by combining the polymer with carbon black and talc or clay.

Talc contains $SiO_2$ in about 62 wt.% and MgO in about 32 wt.% as well as a small amount of a component which has the formula $Mg_3Si_4O_{10}(OH)_2$. Commercially available natural talc can be used for the curable composition of the invention.

Talc has a laminal crystalline structure with weak layer bonds so as to form a flat shape and to impart high inner lubrication. The talc can therefore be mixed with the polyhydroxy hydrocarbon polymer at high ratios without preventing or disturbing processability.

Talc also has a high reinforcing effect for increasing the mechanical strength of the cured product prepared from the curable composition. In addition, talc has hydrophobic properties and imparts water resistance to the cured product by a synergistic effect with the hydrophobic property of the polyhydroxy hydrocarbon polymer and prevents the deterioration of the physical characteristics under wet conditions, especially the electrical characteristics of the cured product.

The talc preferably has a particle size distribution wherein at least 50% of the particles which pass 325 mesh have a particle diameter less than several microns, and the amount of talc used is usually from 10 – 150 wt.% preferably 30 – 100 wt.%, with respect to the weight of the polymer.

The clay contains $SiO_2$ in amounts of about 52 wt.% and $Al_2O_3$ in amounts of about 43 wt.% having the formula

Natural clay can be effectively used in the invention. Clay has a high reinforcement effect which increases the mechanical strength of the cured composition of the invention. Similar to talc, clay imparts a high water resistance to the cured product so as to prevent deterioration of the physical characteristics of the cured product under wet conditions especially preventing deterioration of the electric characteristics.

The amount of clay used may vary but is usually from 10 – 150 wt.%, and preferably 30 – 100 wt.% based on the weight of polymer present.

Both talc and clay are economical natural fillers and, they both impart excellent reinforcing and electric characteristics to the cured composition of the invention. Since both talc and clay impart similar effects, either one can be used as well as mixtures thereof. When clay and talc are used as a mixture, the amounts of each filler indicated above are used.

When other conventional reinforcing fillers such as carbon black or hydrated silica are used instead of talc and/or clay, even though the mechanical characteristics are improved, the electrical characteristics substantially deteriorate. More than 30 wt.% of carbon black to the polymer is required to impart a sufficient degree of reinforcement to the cured product. However, the cured product containing such a large amount of carbon black has very poor electrical characteristics. When hydrated silica is incorporated in the polymer composition to impart a sufficient reinforcing effect, the water resistance and the electric characteristics of the cured product are decreased.

The curable composition of the invention contains carbon black, however the type of carbon black is not limited and may include for example, carbon blacks of any grade such as:

| | |
|---|---|
| SAF | Super abrasion furnace black; |
| ISAF | Intermediate super abrasion furnace black; |
| HAF | High abrasion furnace black; |
| FF | Fine furnace black; |
| FEF | Fast extrusion furnace black; |
| GPF | General purpose furnace black; |
| HPC | Hard processing channel black; |
| EPC | Easy processing channel black; |
| FT | Fine thermal black; |
| MT | Medium thermal black or the like. |

The carbon black can be in the form of a powder, beads, hard beads, or the like. However, it is preferable to use carbon black having a large particle size and especially, Thermal black. The carbon black is usually added as a stabilizer for improving the light fastness and weather durability of the cured product and simultaneously imparts an effect such as a reinforcement of the mechanical strength. The amount of carbon black used is from 0.1 – 20 wt.%, preferably from 0.5 – 6 wt.% based on the weight of the polymer.

In the curable composition used for electric insulating material of the present invention, it is also possible to add other additives such as coloring agents, stabilizers (an antioxidant) or the like.

When the curable composition of the present invention, is cured, an excellently cured product having a rubber-like elasticity is obtained. The cured product obtained has high mechanical strength, high cold resistance, high impact strength over a broad temperature range, high hydrophobic properties and moisture resistance as well as excellent electrical characteristics and highly stable physical characteristics.

Also, the curable composition has excellent processability and moldability in the range of from room temperature to 100° C so as to be moldable by various mold-processes including casting; extrusion molding; low pressure injection molding; transfer molding, or the like.

It is also possible to coat the curable composition by various known methods including hand coating; roller coating; spray coating or the like.

It is further possible to form and to cure the curable composition so as to prepare foam products having various bulk densities.

Accordingly, the curable composition of the invention cna be used in various fields. The cured product provides excellent results in various applications especially in electric insulation in a wet environment, in water or the sea or at a high temperature for a long time.

Having generally described this invention, a further understanding can be obtained by reference to certain specific examples which are provided herein for purpose of illustration only and are not to be limiting unless otherwise specified.

EXAMPLE 1

100 parts by weight of polyhydroxy polybutadiene having an average molecular weight of 2600 and an average hydroxyl group number of 2.3 and having 25% of the double bonds at the 1, 2-position and 75% at the 1, 4 position; 70 parts by weight of a fine talc of size which passes less than 325 mesh (manufactured by Sierra Talc Company), 6 parts by weight of carbon black (Thermal black) and 0.1 parts by weight of di-n-butyl-tin-dilaurate were blended in a paint roller mill to prepare a mixture.

An equivalent (8.2 parts by weight) of tolylenediisocyanate which was a mixture of 65% 2, 4-tolyenediisocyanate and 35% 2, 6-tolylenediisocyanate (hereinafter referred to as 65-tolylenediisocyanate) was mixed with the above mixture to prepare a curable composition. The composition was cured at 100° C for 1 hour. The characteristics of this cured composition (I), are shown in Table 1.

The mechanical characteristics of the cured composition were measured by the Japan Industrial Standard Method, K-6301, and the electrical characteristics were measured by the Japan Industrial Standard Method, K-6911.

EXAMPLE 2

The process of Example 1 was followed using 50 parts by weight of the talc to prepare a similar cured composition. The characteristics of the cured composition (II) are shown in Table 1.

EXAMPLE 3

The process of Example 1 was followed using 70 parts by weight of a calcined clay instead of the talc to prepare a similar cured composition. The characteristics of the cured composition (III) are shown in Table 1.

EXAMPLE 4

The process of Example 1 was followed using hydrogenated polyhydroxypolybutadiene having a numeral average molecular weight of 2800, a hydrogenation degree of 87% and an average hydroxyl group number of 2.2, instead of the polyhydroxy-polybutadiene of Example 1 to prepare a similar cured composition. The characteristics of this cured composition, Composition (IV) are shown in Table 1.

EXAMPLE 5

The process of Example 1 was followed using 100 parts by weight of hydrogenated polyhydroxy-polybutadiene having an average molecular weight of 2900, a degree of hydrogenation of 98% and an average hydroxyl group number of 2.2, instead of the polyhydroxy-polybutadiene. Also 1 part of 2, 6-di-t-butyl-paracresol was added as a curing agent to prepare a similar composition. The characteristics of this cured composition, Composition (V), are shown in Table 1.

to prepare a curable composition. The characteristics of the cured product (VIII) prepared from the curable composition are shown in Table 2.

REFERENCE 4

The process of Example 2 was followed using 50 parts by weight of a hydrated silica instead of the talc to prepare a curable composition. The characteristics of the cured product (IX) prepared from the curable composition are shown in Table 2.

TABLE II

| Characteristic Cured Product | | Dielectric constant 60 Hz | 1 Kz | Dielectric loss tangent 60 Hz | 1 Kz | Volume specific resistance ($\Omega$ cm) | Breakdown voltage (KV/mm) (in oil) | Mechanical properties Strength (kg/cm$^2$) | Elongation (%) | JIS hardness |
| --- | --- | --- | --- | --- | --- | --- | --- | --- | --- | --- |
| VI | 20°C | 10< | 10< | 0.1< | 0.1< | $2.1 \times 10^6$ | 2.0 | 139 | 250 | 70 |
|  | 120°C | 10< | 10< | 0.1< | 0.1< | $10^6>$ |  |  |  |  |
| VII | 20°C | 5.3 | — | 0.039 | — | $2.2 \times 10^{13}$ | 5.0 | 106 | 290 | 72 |
|  | 120°C | 3.8 | — | 0.057 | — | $10^6>$ |  |  |  |  |
| VII | 20°C | 5.8 | 4.7 | 0.065 | 0.052 | $5.1 \times 10^{12}$ | 27.6 | 70 | 300 | 50 |
|  | 120°C | — | — | 0.091 | 0.076 | — |  |  |  |  |
| IX | 20°C | 6.2 | 5.5 | 0.075 | 0.060 | $9.0 \times 10^{14}$ | 30 | 158 | 710 | 66 |
|  | 120°C | 10< | 10< | 0.1< | 0.1< | $1.7 \times 10^{12}$ |  |  |  |  |

Comparing Tables 1 and 2, it is apparent that the characteristics of the cured product prepared from the curable composition of the present invention are remarkably superior to those of the cured product of the references. It can be seen from this comparison that:

1. The cured product (I) of Example 1 has a lower dielectric constant and dielectric loss tangent and

TABLE I

| Characteristics Composition | | Dielectric constant 60 Hz | 1 Kz | Dielectric loss tangent 60 Hz | 1 Kz | Volume specific resistance ($\Omega$ cm) | Breakdown voltage (KV/mm) (in oil) | Mechanical properties Strength (kg/cm$^2$) | Elongation (%) | JIS hardness |
| --- | --- | --- | --- | --- | --- | --- | --- | --- | --- | --- |
| I | 20°C | 3.81 | 3.68 | 0.020 | 0.019 | $1.5 \times 10^{14}$ | 30 | 88 | 240 | 79 |
|  | 120°C | 3.10 | 3.06 | 0.012 | 0.005 | $2.8 \times 10^{13}$ |  |  |  |  |
| II | 20°C | 3.88 | 3.68 | 0.029 | 0.026 | $2.7 \times 10^{14}$ | 31.7 | 93 | 250 | 71 |
|  | 120°C | 3.01 | 3.05 | 0.012 | 0.005 | $6.7 \times 10^{13}$ |  |  |  |  |
| III | 20°C | 5.20 | 4.68 | 0.061 | 0.045 | $2.6 \times 10^{13}$ | 24.3 | 101 | 140 | 85 |
|  | 120°C | 3.97 | 3.66 | 0.059 | 0.024 | $2.7 \times 10^{13}$ |  |  |  |  |
| IV | 20°C | 3.74 | 3.58 | 0.023 | 0.022 | $7.2 \times 10^{14}$ | 32.9 | 121 | 70 | 90 |
|  | 120°C | 3.68 | 2.98 | 0.006 | 0.005 | $8.8 \times 10^{13}$ |  |  |  |  |
| V | 20°C | 3.77 | 3.63 | 0.021 | 0.021 | $2.2 \times 10^{14}$ | 30 | 13 | 58 | 91 |
|  | 120°C | 3.06 | 3.03 | 0.009 | 0.004 | $9.6 \times 10^{13}$ |  |  |  |  |

REFERENCE 1

100 parts by weight of the polyhydroxy polybutadiene of Example 1, 6 parts by weight of Thermal carbon black, 30 parts by weight of carbon black (HAF) and 0.1 parts by weight of di-n-butyl-tin-dilaurate were mixed and then further admixed with 8.2 parts by weight of 65-tolylenediisocyanate to prepare a curable composition. The characteristics of the cured product (VI) prepared from the curable composition are shown in Table 2.

REFERENCE 2

The process of Reference 1 was followed by using the hydrogenated polyhydroxy polybutadiene of Example 4 instead of the polyhydroxy polybutadiene to prepare a curable composition. The characteristics of the cured product (VII) prepared from the curable composition are shown in Table 2.

REFERENCE 3

100 parts by weight of polypropyleneglycol, and 18 parts by weight of 65-tolylenediisocyanate were mixed higher volume specific resistance and breakdown voltage and therefore is superior as an electric insulating material in comparison to the cured product (VI) of Reference 1 using only carbon black;

2. The cured product (IV) of Example 4 has a higher volume specific resistance and breakdown voltage and therefore is superior as an electric insulating material in comparison to the cured product (VII) of Reference 2 using carbon black alone without talc;

3. The cured product (VIII) of Reference 3 is a conventional polyurethane which has a lower volume specific resistance in comparison to the cured product of Examples of the present invention.

4. The cured product (II) of Example 2 has a lower dielectric constant and dielectric loss tangent at high temperatures and has a high volume specific resistance in comparison to the cured product (IX) of Reference 4 using a hydrated silica without talc.

EXAMPLE 6

The process of Example 1 was followed using 90 parts by weight of the same talc of Example 1 to prepare a similar cured composition. The characteristics of the cured composition (X) are shown in Table 3.

EXAMPLE 7

The process of Example 1 was followed using 1 part by weight of the carbon black and 70 parts by weight of the same talc as in Example 1 to prepare a similar cured composition. The characteristics of the cured composition (XI) are shown in Table 3.

EXAMPLE 8

The process of Example 7 was followed except that the polyhydroxy polybutadiene was replaced with 100 parts by weight of a hydrogenated polyhydroxy polybutadiene having a degree of hydrogenation of 98% used in Example 5, to prepare a similar cured composition. The characteristics of the cured composition (XII) are shown in Table 3.

EXAMPLE 9

The process of Example 7 was followed except that 70 parts by weight of the talc were replaced with a mixture of 35 parts by weight of the talc and 35 parts by weight of clay, to prepare a similar cured composition. The characteristics of the cured composition (XIII) are shown in Table 3.

EXAMPLE 10

The process of Example 7 was followed using 30 parts by weight of the talc to prepare a similar cured composition. The characteristics of the cured composition (XIV) are shown in Table 3.

TABLE III

| Characteristic Cured Composition | | Dielectric constant 60 Hz | 1 Kz | Dielectric loss tangent 60 Hz | 1 Kz | Volume Specific resistance ($\Omega$ cm) | Breakdown voltage (KV/mm) (in oil) | Mechanical Properties Strength (kg/cm$^2$) | Elongation (%) | JIS hardness |
|---|---|---|---|---|---|---|---|---|---|---|
| X | 20°C | 3.90 | 3.83 | 0.010 | 0.012 | 2.6 × 10$^{13}$ | 32.9 | 125 | 139 | 85 |
|  | 120°C | 3.32 | 3.27 | 0.017 | 0.005 | 7.0 × 10$^{11}$ | | | | |
| XI | 20°C | 3.78 | 3.54 | 0.035 | 0.032 | 2.0 × 10$^{15}$ | 28 | 72 | 252 | 68 |
|  | 120°C | 3.22 | 3.13 | 0.026 | 0.012 | 6.2 × 10$^{12}$ | | | | |
| XII | 20°C | 3.22 | 3.08 | 0.028 | 0.027 | 2.8 × 10$^{16}$ | | | | |
|  | 120°C | 2.89 | 2.88 | 0.005 | 0.007 | 1.8 × 10$^{14}$ | 28 | 175 | 220 | 93 |
| XIII | 20°C | 3.73 | — | 0.016 | — | 3.1 × 10$^{15}$ | 20 | 71 | 213 | 71 |
|  | 120°C | 3.44 | — | 0.028 | — | 2.6 × 10$^{13}$ | | | | |
| XIV | 20°C | 3.34 | 3.24 | 0.011 | 0.019 | 4.2 × 10$^{15}$ | 30 | 98 | 376 | 57 |
|  | 120°C | 2.89 | 2.87 | 0.003 | 0.001 | 9.4 × 10$^{12}$ | | | | |

Having now fully described the invention, it will be apparent to one of ordinary skill in the art that many changes and modifications can be made thereto without departing from the spirit or scope of the invention as set forth herein.

What we claim as new and desire to secure by Letters Patent of the United States is:

1. A curable composition having excellent electrical properties, which comprises:
   a polyhydroxy hydrocarbon polymer characterized by a hydroxyl group content of at least about 1.5 and selected from the group consisting of polyhydroxy diene polymers, hydrogenated polyhydroxy diene polymers, mixtures of unsaturated, polyhydroxy diene polymers and saturated polyhydroxy diene polymers, oxdized hydrogenated products of isobutylene-diene copolymers and oxidized hydrogenated products of $\alpha$-olefin-nonconjugated diene copolymers;
   from 10 – 150 wt.% of talc, clay or mixtures thereof, from 0.1 – 20 wt.% of carbon black and from 1 – 50 wt.% of a curing agent, wherein the percent by weight limitations are based on the amount of said polyhydroxy hydrocarbon polymer.

2. The curable composition of claim 1, wherein said polyhydroxy hydrocarbon polymer is a saturated polyhydroxy hydrocarbon polymer.

3. The curable composition of claim 1, wherein said polyhydroxy hydrocarbon polymer is a mixture of saturated and unsaturated polyhydroxy hydrocarbon polymers.

4. The curable composition of claim 1, wherein said polyhydroxy hydrocarbon polymer is polyhydroxy diene polymer.

5. The curable composition of claim 1, wherein said curing agent is polycarboxylic acid, an anhydride thereof, a halogenated polycarboxylic acid, a polyepoxide or a polyisocyanate.

6. The curable composition of claim 1, wherein said curing agent is polyisocyanate.

7. The curable composition of claim 4, wherein said polyhydroxy diene polymer is prepared by polymerization of 100 – 25% by weight of a conjugated diene monomer and 0 – 75% by weight of a comonomer represented by the formula:

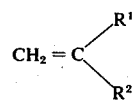

wherein R$^1$ represents a hydrogen atom or an alkyl group; R$^2$ represents aryl, carboxyl, ester, nitrile or pyridyl.

8. A cured composition prepared by curing said curable composition of claim 1.

* * * * *